(12) United States Patent
Olschewski (10) Patent No.: US 9,476,761 B2
(45) Date of Patent: Oct. 25, 2016

(54) SYSTEM FOR MAKING AVAILABLE INFORMATION WHICH REPRESENTS A VIBRATION STATE FOR THE OPERATION OF VIBRATION-EMITTING MACHINES, IN PARTICULAR CONSTRUCTION MACHINES

(75) Inventor: Thomas Olschewski, Salzwedel (DE)

(73) Assignee: HAMM AG, Tirschenreuth (DE)

( * ) Notice: Subject to any disclaimer, the term of this patent is extended or adjusted under 35 U.S.C. 154(b) by 404 days.

(21) Appl. No.: 14/118,343

(22) PCT Filed: May 18, 2012

(86) PCT No.: PCT/EP2012/059255
§ 371 (c)(1),
(2), (4) Date: Nov. 18, 2013

(87) PCT Pub. No.: WO2012/156507
PCT Pub. Date: Nov. 22, 2012

(65) Prior Publication Data
US 2014/0083195 A1 Mar. 27, 2014

(30) Foreign Application Priority Data
May 19, 2011 (DE) .................. 10 2011 076 131

(51) Int. Cl.
*G01H 17/00* (2006.01)
*E01C 19/28* (2006.01)

(52) U.S. Cl.
CPC ............ *G01H 17/00* (2013.01); *E01C 19/288* (2013.01)

(58) Field of Classification Search
CPC ............................ E01C 19/288; G01H 17/00
USPC .......................................................... 73/649
See application file for complete search history.

(56) References Cited

U.S. PATENT DOCUMENTS 4,352,293 A * 10/1982 Kurihara .................. G01H 3/08
702/56
5,610,339 A * 3/1997 Haseley .................. F04C 28/28
702/56

(Continued)

FOREIGN PATENT DOCUMENTS

| EP | 1 985 760 A1 | 10/2008 |
| JP | 2000 204552 A | 7/2000 |
| KR | 2009 0129736 A | 12/2009 |
| WO | 2008/033969 A2 | 3/2008 |

OTHER PUBLICATIONS

German Search Report dated Apr. 18, 2012; 5 pages.

(Continued)

*Primary Examiner* — J M Saint Surin
(74) *Attorney, Agent, or Firm* — Rothwell, Figg, Ernst & Manbeck, P.C.

(57) ABSTRACT

A system for making available information which represents a vibration state for the operation of vibration-emitting machines, in particular construction machines, comprising at least one measuring station (12, 12', 12") having at least one sensor (20) for detecting at least one variable which relates to the vibration state and having a radio-transmitting unit (24) for outputting a radio output signal which relates to the variable, or at least one reception station (16, 16', 16") for picking up the radio output signal of the at least one measuring station (12, 12', 12"), is characterized in that the at least one measuring station (12, 12', 12") comprises an evaluation unit (22) which picks up a sensor signal from the at least one sensor (20) and has the purpose of making available an evaluation signal, representing the vibration state, on the basis of the sensor signal, wherein the radio-transmitting unit (24) generates the radio output signal on the basis of the evaluation signal.

12 Claims, 3 Drawing Sheets

(56) References Cited

U.S. PATENT DOCUMENTS

| | | | | |
|---|---|---|---|---|
| 5,854,994 A | * | 12/1998 | Canada | G01H 1/003 340/3.63 |
| 5,907,491 A | * | 5/1999 | Canada | G01H 1/003 340/3.1 |
| 8,174,402 B2 | * | 5/2012 | Bouse | G05B 19/4065 340/635 |
| 8,930,090 B2 | * | 1/2015 | Okamura | E02F 9/2203 414/685 |
| 2008/0286044 A1 | * | 11/2008 | Laux | E01C 19/288 404/84.05 |

OTHER PUBLICATIONS

Chinese Office Action issued for Chines Patent Application No. 201280020280.1 dated Jan. 12, 2015 (5 pages).

* cited by examiner

SYSTEM FOR MAKING AVAILABLE INFORMATION WHICH REPRESENTS A VIBRATION STATE FOR THE OPERATION OF VIBRATION-EMITTING MACHINES, IN PARTICULAR CONSTRUCTION MACHINES

CROSS REFERENCE TO RELATED APPLICATION

This application is a 35 U.S.C. 371 National Phase Entry Application from PCT/EP2012/059255, filed May 18, 2012, which claims the benefit of German Patent Application No. 10 2011 076 131.4 filed on May 19, 2011, the disclosure of which is hereby incorporated by reference.

The present invention relates to a system for making available information that represents a vibration state for the operation of vibration-emitting machines, in particular construction machines, comprising at least one measuring station with at least one sensor for recording at least one variable related to the vibration state, and with a radio-transmitting unit to put out a radio output signal related to the variable, as well as at least one reception station to pick up the radio output signal of the at least one measuring station.

Such a system is known from EP 1 985 760 A1. In an area to be worked by compactors, sensors are positioned, for example, at relevant measuring locations in association with various structures to record the oscillation state at the respective measuring location and transmit the oscillation measuring values via radio directly to a data recording- and processing unit. In said data recording- and processing unit, which can be accommodated directly at a compactor, for example, the oscillation measuring values are processed, for example to provide information that the oscillation measuring value is smaller than a specified limit value, equal to the limit value, or greater than the limit value. Then, compacting parameters of a compactor are changed automatically in a control circuit to avoid exceeding the limit value and/or, if said limit value has already been exceeded, to ensure the return to the permissible working range. By recording the position of a compactor and also the position of the various oscillation sensors and comparing said positions while also taking into consideration the distance of a compactor to the oscillation sensors, this known system can differentiate as to which oscillation measuring values are relevant for a compactor and therefore for its operation.

The object of the present invention is to provide a system for making available information that represents a vibration state for the operation of vibration-emitting machines, in particular construction machines, as well as a method for operating such a machine in a simple manner with increased operational safety to avoid the creation of vibration-induced damage to structures.

According to the invention, the object of the invention is attained with a system for making available information that represents a vibration state for the operation of vibration-emitting machines, in particular construction machines, comprising at least one measuring station with at least one sensor to detect at least one variable related to the vibration state, and with a radio-transmitting unit to put out a radio output signal related to the variable, as well as at least one reception station to pick up the radio output signal of the at least one measuring station.

According to a first aspect of the present invention, it is further provided that the at least one measuring station comprises an evaluation unit that picks up a sensor signal from the at least one sensor to provide an evaluation signal that represents the vibration state based on the sensor signal, with the radio transmitting unit generating the radio output signal based on the evaluation signal.

Whereas with the system known from prior art, the oscillation measuring values and/or oscillation signals generated by the various sensors are transmitted via radio to a data processing unit, with the system according to the invention the data processing and/or at least part of the data processing is performed in the actual measuring station(s). What is transmitted is therefore a result or a partial result of the data processing, which means that the quantity of the data and/or information to be transmitted is clearly reduced. This allows the utilization of radio transmission paths using lower radio frequencies. The result is a higher degree of penetration, for example with masonry, as well as a clearly increased range, which means that communication dependability and therefore also the dependability in taking into account vibration-relevant information can be clearly increased during the operation of a vibration-emitting machine. Another advantage is that the lesser data quantity to be transmitted requires shorter transmission times and therefore the energy effort required for the transmission is reduced.

The system according to the invention may furthermore provide that the at least one reception station comprises a radio-reception unit to receive the radio output signal of at least one measuring station, and a signal processing unit to generate vibration display information for an optical and/or acoustical vibration state display unit and/or for generating vibration state reaction trigger information to trigger a vibration-emitting machine.

A reception station of this type ensures that the signals that were already processed in one or a plurality of measuring stations can be taken into account in form of a signal- and/or data processing result, for example to indicate to an operator through appropriate optical and/or acoustical replay whether or not there is a critical oscillation state at one or, if applicable, a plurality of measuring locations. Alternately or in addition, the information already processed in one or a plurality of measuring stations can be used to trigger a vibration-emitting machine and/or influence its operation in such a way that a possibly already existing critical vibration state is left or, if the machine is being operated in a permissible range, the oscillation intensity is increased so as to reduce the required machining time without reaching a critical state.

With the system according to the invention, at least one sensor can be developed as an acceleration sensor. Alternately or in addition, at least one sensor can be developed as speed sensor. These sensors make it possible to provide signals reliably representing the vibration state of a measuring location; said signals can be used for subsequent information processing in the evaluation unit of at least one measuring station.

In an especially advantageous modification of the system according to the invention it is proposed to develop the evaluation unit to generate the evaluation signal based on the following information:

a location information that represents a measuring location and/or a measuring zone around the measuring location, and/or a vibration threshold information, and/or a vibration information that represents the type of vibration, preferably in connection with a vibration type threshold value information, and/or a measuring time information, preferably in connection with a measuring time threshold value information.

The data processing performed in at least one measuring station can therefore include different relevant variables, again with the result that already at the reception station, data that is relevant for the operation of a vibration-emitting machine can be reported and/or utilized already taking into account such information, which is also relevant for the operation of a vibration-emitting machine.

To that end, it is especially advantageous if the evaluation unit has at least one associated interface to input at least one information to be used as basis in connection with the sensor signal for generating the evaluation signal and/or of configuration information. Via said at least one interface, the information to be taken into account in the data processing can be placed into the evaluation unit. It must be pointed out that the interface can be developed to directly connect the evaluation unit and/or a measuring station to a device, for example via a cable connection, to input said information. It goes without saying that it is also possible to develop said interface as a radio connection interface to transmit said relevant information to a measuring station via radio, for example also from the reception station.

In another especially advantageous development of the system according to the invention, it is provided that the evaluation unit has an associated memory unit to store the sensor signal of at least one sensor and/or the evaluation signal, preferably for later on generating the radio output signal. Recording the sensor signal makes it possible to reconstruct the vibration state at the respective measuring location at a later time; for this purpose, it is advantageous to store the sensor signal with the appropriate time information. Furthermore, it is possible in this way, for example if the data transmission connection between a measuring station and the reception station is temporarily interrupted due to unforeseen circumstances, to access the stored sensor signal, generate an evaluation signal, and then transmit said evaluation signal to the reception station once communication between said stations is restored. To that end, it may also be advantageous that alternately or in addition to saving the sensor signal of at least one sensor, the evaluation signal generated from it is also stored to be able to transmit said evaluation signal for past time ranges once radio communication is restored.

To reconstruct in the reception station where and/or in which area the vibration state may or may not be critical, it is furthermore proposed that the radio output signal put out by at least one measuring station includes identification information that identifies the measuring station. It may also be provided that the identification information provides information about the measuring location and/or a measuring zone around the measuring location of the measuring station.

According to another aspect, it may be provided with the system according to the invention, either alternately or in combination with the groups of features explained above, that a plurality of measuring stations and/or reception stations is provided, with at least one measuring station and/or reception station having a radio receiving unit to receive the radio output signal of at least one of the other measuring stations and/or reception stations, with the radio transmission unit of the at least one measuring station and/or a radio transmission unit of at least one reception station being developed to generate a radio output signal based on a radio output signal received from another measuring station.

As already mentioned earlier, the fact that the data- and/or information volume to be transmitted is clearly reduced with the system according to the invention already provides the option of making available a more reliable radio connection because of the greater range and the higher degree of penetration. If it is furthermore provided that different measuring stations and/or reception stations can communicate with one another and forward the radio output signals put out by other stations, the transmission reliability between the measuring stations and the at least one reception station is further increased. In particular, this is where redundant transmission paths can be provided so that, for example if a transmission path is shielded due to the fact that a construction machine is moving in front of a measuring station and shielding if from direct radio communication with the reception station, other transmission paths can be utilized via one or a plurality of other measuring stations to be able to send the radio output signal of a measuring station that is temporarily shielded, or possibly permanently shielded because of its position, to the reception station.

Preferably, it is provided that the radio output signal generated by the radio transmission unit of the at least one measuring and/or reception station corresponds to the radio output signal received from another measuring station or reception station. This means that the various stations are developed to forward the radio output signals picked up from other stations in principle without changing their content so that in the reception station, the transmission path can be ignored, for example when displaying or repeating the signal content.

Another especially advantageous embodiment provides that a plurality of measuring stations and/or reception stations form a meshed network to transmit information to at least one reception station. This means that the various stations cooperate like a so-called ad hoc network where the transmission paths that are possible and/or feasible in the network are identified and/or selected based on appropriate routing protocols.

The system according to the invention can work especially advantageously if alternately or in addition to the various measuring stations, at least one reception station, which is provided at a compactor, for example, can be utilized to provide this type of routing functionality. This increases the potential number of nodes in a network, which can contribute to a corresponding increase in the transmission reliability, especially if such a reception station can move with a compactor and it can therefore be assumed that it will not be permanently covered by a structure or another machine and therefore shielded from radio transmission.

According to another aspect of the present invention, the problem described above is solved with a method for operating a machine, in particular a construction machine, based on information that represents a vibration state, preferably using a system according to the invention, with the system comprising the measures:

defining a measuring zone associated with at least one measuring station, generating information that represents a vibration state in the measuring zone of the at least one measuring station, taking the information that represents the vibration state into account for the operation of the machine only if said machine is in the measuring zone or moves in the measuring zone.

This approach makes it possible to take into account the existing topological and/or substrate properties in an area subject to vibration when defining the respective measuring zones. This allows making a decision whether a vibration-emitting machine is even relevant at all for the respective measuring zone, or if it is principally non-critical for structures in a respective measuring zone, for example because of the fact that it is outside of the measuring zone and/or does not move toward the measuring zone and/or into the measuring zone. If this is the case, the information provided in such a zone does indeed not have to be taken into account for the further operation of a machine. Because the definition of such measuring zones can also take into account the vibration transmission properties, it is in particular possible, if the distance between a measuring station and a vibration-emitting machine is relatively large and the intermediate substrate transmits vibrations very well, to take said fact into account and possibly reach the conclusion that the current operation of a machine may be critical despite the relatively large distance.

The measuring zone can be defined on the basis of:
the properties of the substrate in the area of the measuring zone, and/or
the type of the measuring location, and/or
the type of the vibrations.

According to the invention, it is therefore possible and/or provided in the definition of the measuring zone to take into account various aspects that influence the vibration behavior. For example, the oscillation transmission potential and/or oscillation damping potential can be taken into consideration by taking into account the properties of the substrate. Substrates that conduct oscillations well generally lead to a measuring zone that is stretched farther because the vibrations generated by machines that are positioned farther away from the measuring location can then also lead to a critical oscillation state at the measuring location. It goes without saying that it can also be taken into account that the substrate can have different properties in various directions proceeding from the measuring point and therefore the measuring zone can stretch differently into various directions. Furthermore, by taking into account the type of measuring location, for example whether it is a ground area, a building, a bridge, or the like, the sensitivity of the measuring location as such can be taken into consideration and, for example, a greater measuring zone can be provided for sensitive measuring locations than for less sensitive measuring locations. Finally, by taking into consideration the type of the vibrations, it can also be taken into account, for example, to which extent said vibrations, which are generated by a construction machine or perhaps an explosion, can lead to critical situations for a measuring location. In particular, a link to the type of measuring location may be provided in this context, because different types of measuring locations principally may have different vulnerabilities with various types of vibrations and/or oscillation excitations.

The present invention is explained in the following with reference to the attached figures, which show.

Figure 1:
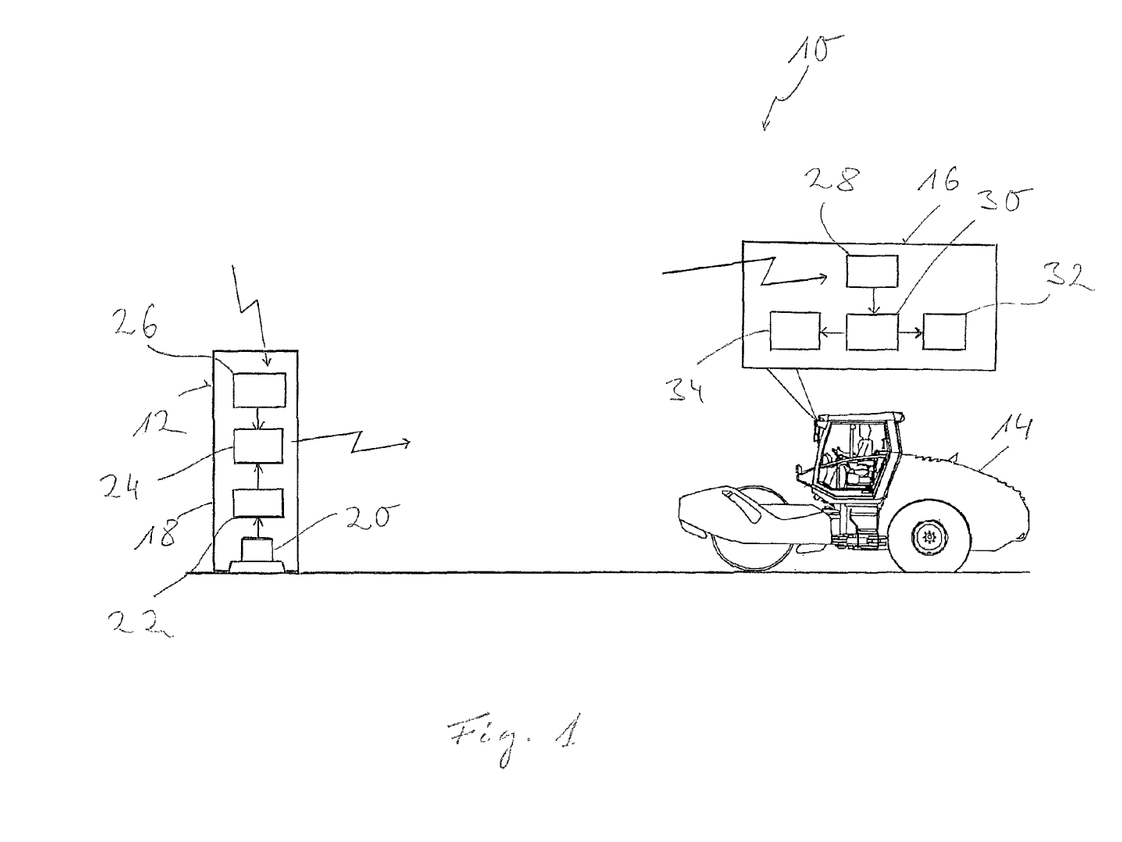
FIG. 1 in principal representation, the setup of a system for making available information that represents a vibration state.

FIG. 1 generally describes with reference symbol 10 a system for making available information that represents a vibration state. The system shown in FIG. 1 comprises a measuring station 12 and, for example, a reception station 16 arranged at a construction machine, here a compactor 14, especially a ground compactor. It is already here pointed out that it goes without saying that the system 10 normally can comprise more than one measuring station 12 and also more than one reception station 16, for example if a plurality of compactors 14 are used at a construction site.

The measuring station 12, which is advantageously developed in a portable fashion, comprises in a housing 18 at least one sensor 20, which can be developed as acceleration sensor or as speed sensor. It goes without saying that the measuring station 12 can also comprise a plurality of sensors 20, for example to increase operational reliability even more in that when one sensor fails, the signal of another sensor is used or the signals of various sensors are checked for abnormalities and appropriate warnings are generated in case of excessive abnormalities. It is furthermore possible to arrange the at least one sensor 20 outside of the housing 18, for example to be able to place it on an object to be monitored or on a substrate. In that case, a data transmission connection between the sensor(s) 20 and other system areas in the measuring station can be achieved with a cable connection, for example.

The sensor signal generated by the sensor 20 is forwarded to an evaluation unit 22, where the sensor signal is evaluated in the type and manner described below to generate information that is relevant for the operation of the compactor 14. The evaluation signal generated in the evaluation unit 22 based on the sensor signal is transmitted to a radio-transmitting unit 24, which is designed to convert the evaluation signal into a corresponding radio output signal and put out the same.

Furthermore, the measuring station 12 advantageously comprises a radio receiving unit 26. Via the radio receiving unit 26, radio output signals of all other measuring stations 12 can be picked up, forwarded to the radio transmission unit 24, and then again put out by the same.

A radio receiving unit 28 is provided in the reception station 16, which picks up the radio output signal transmitted by one or a plurality of measuring stations 12. Said signal is then forwarded to a signal processing unit 30. In the signal processing unit 30, the information in the received radio output signal can be converted and/or used in such a fashion that the information to be communicated to an operator is displayed in an information display unit 32, for example an optical display unit 32. It goes without saying that said display can also occur alternately or additionally in an acoustic fashion and/or in any fashion that is perceptible to the operator. For example, it is also possible to use a vibration state that is perceptible to the operator and can be appropriately varied according to the information to be communicated.

Furthermore, the radio receiving unit 16 can comprise a trigger unit 34 and/or an existing trigger unit in a vibration-emitting machine to introduce the information representing the vibration state directly into the triggering of the machine, for example by changing various vibration parameters such as, for example, the vibration frequency and/or vibration amplitude, especially if a critical vibration state was recorded.

To actually contact one or a plurality of measuring stations 12 or other system areas, the reception station 16 can also comprise a radio-transmitting unit.

To operate the system shown in FIG. 1, the measuring station(s) 12 is/are positioned at a specific measuring location. The principal approach is that the measuring station(s) 12 is/are positioned in such a manner and at such a location that the vibration state to be monitored, i.e., the vibrations acting on a structure, can be recorded in such a fashion that it provides clues as to the vibration load of the structure. To that end, the measuring station 12 can either be positioned on the substrate to be monitored for its vibration state or, for example, it can be attached at the masonry of a structure to be monitored for its vibration state such as, for example, buildings or bridges. For the vibration state monitoring operations various information relevant for the subsequent evaluation of the sensor signal and/or for the radio output signal to be generated is deposited in the evaluation unit 22. Said information comprises, for example, the measuring location, which can be defined in form of the existing GPS data for a respective positioning. Furthermore, the measuring location can be specified by identifying the object to be monitored, such as, for example, as a residential building, a commercial building, a bridge, a tower, or the like. In association with a respective measuring location, measuring location-related threshold values can be deposited so that a great number of various measuring locations and/or types of structures and, for example, the threshold values associated with them, can be deposited in the evaluation unit 22 so that the respective monitoring operation only identifies the type of object to be monitored, and the evaluation unit 22 then automatically uses the associated threshold value. Alternately, for example, the type of the object to be monitored and the associated threshold value for each monitoring operation can be deposited in the evaluation unit 22.

Furthermore, time-relevant information can be deposited so that, for example, in association with various objects to be monitored, other threshold values are set for nighttime as opposed to daytime, and/or can be taken into account in the evaluation. Finally, information related to the generation of the vibrations to be monitored can also be deposited in the evaluation unit 22. This process-related information can reproduce, for example, whether vibrations are generated by one or a plurality of soil compactors 14 or whether, for example, piling equipment is used, or a detonation is planned. The respective threshold values can then be provided for these purposes as well, and/or various evaluation methods can be used, depending on the type and manner of generating the vibration.

To deposit said information in the measuring station 12 and/or the evaluation unit 22, the measuring station 12 can comprise an interface where, for example, appropriate information can be inputted via a transmission cable. The radio receiving unit 26 can also be used as such an interface to transmit said information via radio, for example from a reception unit 16 to the measuring station 12 and therefore to the evaluation unit 22. However, in principle, the measuring station 12 itself can also be equipped with an operating unit suitable for inputting information, such as a keyboard, touchpad, or the like.

Furthermore, in association with the evaluation unit 22, the measuring station 12 can also comprise a memory unit to store the sensor signal of the sensor 20 and/or the evaluation signal generated by the evaluation unit 22, with the respective associated time information. For example, this allows the evaluation and/or transmission at a later date if radio communication between a measuring station 12 and the reception station 16 is temporarily interrupted. If necessary, it is then also possible to perform a detailed analysis of the sensor signals. Furthermore, the measuring station 12 preferably comprises an energy source, for example in form of one or a plurality of batteries or accumulators, to ensure that each measuring station 12 can also work independently without external energy supply.

The sensor signal generated in the sensor 20 is preferably provided as a speed signal and/or converted into a speed signal. For example, said signal can then be subjected to a frequency band limitation in the evaluation unit 22, which for example can depend on the type and manner in which vibrations are generated. For an operation with one or a plurality of soil compactors 14, for example, a frequency range of 1 to 80 Hz can be selected, whereas, for example, higher frequencies up to 300 Hz can be taken into account for detonations. The thusly band-limited signal can then be analyzed with respect to the peak speed values or with respect to the effective speed values and compared to the respective limit values. The output information provided in the evaluation unit 22, taking into account the various information already provided earlier, if applicable, can then display, for example, whether or not a respective limit value was exceeded, or the size of the actual vibrations in relation to the specified threshold value in percentages, for example. This information is then transmitted to the radio-transmitting unit 24 in form of the evaluation signal and sent from said radio-transmitting unit to the reception station 16. The reception station 16 can be developed such that it generates an appropriate display in the display unit 32 and/or an appropriate trigger intervention for the compactor 14 only if the threshold value is exceeded. If percentages are displayed, they can also be shown to the operator in form of a colored bar chart, for example.

If the reception station 16 is cooperating with a plurality of measuring stations 12 in the system, the reception station 16 and/or its signal processing unit 30 can be developed to display or otherwise represent only that part of the information received from various measuring stations representing various vibration states which indicates a critical vibration state or the tendency in the direction of a critical vibration state. In this way, the information made available to an operator can be reduced to a volume that on the one hand allows taking appropriate countermeasures, but on the other hand avoids an overload of information that is actually not relevant.

In the measuring station 12 as well as in the reception station 16, the various units provided therein can be provided as separate subassemblies which will be connected, for example, by means of plug- or cable connections to exchange signals. Principally, however, an integrated development of at least some of the respective units in one circuit is possible.

The development of the system 10 described above and/or its operating mode on the one hand facilitates reducing the information transmitted between a measuring station 12 and a reception station 16 to a minimum information density for the operation of the compactor 14. Compared to transmitting a sensor signal of the sensor 20 which contains the complete frequency volume, this allows the use of clearly lower frequencies, for example in a range between 800 and 900 MHz. This radio frequency has a substantially greater range compared to the higher-frequency signals. The degree of penetration through masonry is also clearly improved so that in general, an increased reliability in radio communication between the measuring station 12 and the reception station 16 can be guaranteed. Furthermore, the processing effort in the reception station 16 is reduced to the required minimum, which is particularly advantageous if a plurality of measuring stations 12 is being used. In particular, this makes it possible to store the received signals and/or the information represented in said signals, if applicable in association with various measuring stations, in the reception station 16, as well to be able to perform a precise analysis at a later date, if necessary. Here too, the signals received from the measuring stations 12 are advantageously saved in association with the appropriate time information so that not only the measuring location, but also the measuring time can be identified, which in turn ensures the comparability of correspondingly time-coded information about the operation of a vibration-emitting machine.

A further increase in the operational reliability can be ensured with the system according to the invention in that the information transmitted by various measuring stations 12 does not necessarily directly lead to a triggering intervention in the operation of a vibration-emitting machine in a reception station 16, but rather that the decision as to how to react to various vibration states is left up to the operator. Because of the fact that the measuring stations 12 can be distributed over a large area and it cannot be ruled out that intended or unintended manipulations at the measuring stations 12 can lead to a falsification of the actual vibration state, if an information is displayed that appears implausible, an operator can then decide to continue operations without change, or if changes are required, if applicable. Principally, an appropriate plausibility check could also be performed in an automatically operating system. This could be done such that in a case where a plurality of various measuring stations indicate an uncritical vibration state, whereas one single measuring station indicates a critical state, a check is performed whether principally the situation can occur that only said one measuring station indicates a critical vibration state and that, if this is at least theoretically not possible or unlikely, the information from said measuring station is ignored and/or a corresponding warning is generated to indicate to an operator that a measuring station transmitted implausible information.

The operation of a system 10 constructed in principle as described above with a plurality of measuring stations 12 and a plurality of reception stations 16 is explained in the following in greater detail with reference to FIG. 2.

Figure 2:
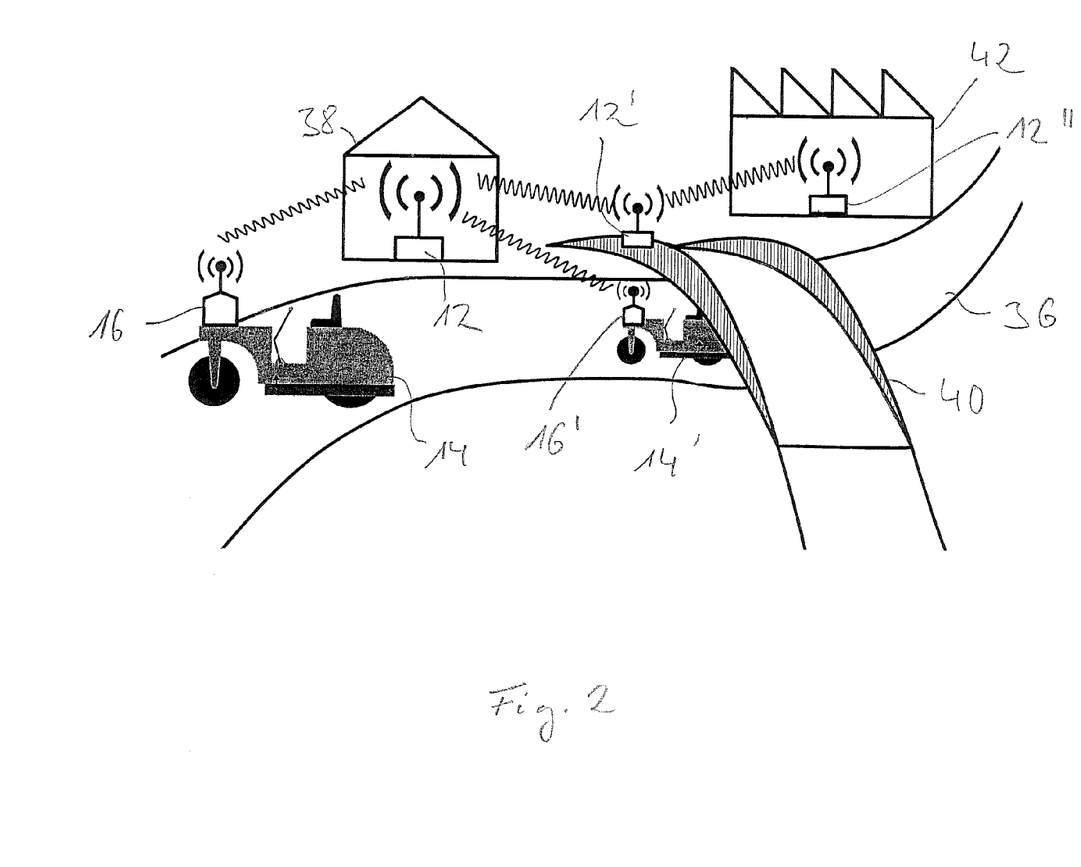
FIG. 2 another principal representation, which shows the interaction between various measuring stations and various reception stations.

FIG. 2 shows a construction site where the substrate for a road 36 to be built is to be compacted by two compactors 14, 14'. A reception unit 16 and/or 16', which is designed as described above, is provided at each of said compactors 14, 14'. Measuring stations 12, 12', 12" are provided in association with the various objects to be monitored. For example, the measuring station 12 monitors the vibration state in the area of a residential building 38. The measuring station 12' monitors the vibration state in the area of a bridge 40, and the measuring station 12" monitors the vibration state in the area of a commercial building 42. As explained above, the information identifying the various measuring locations and/or the various objects to be monitored and the associated threshold values can be deposited in the evaluation units 22 of said various measuring stations 12, 12', 12" and/or used for evaluating the sensor signals.

Because of the evaluation signal generated in the measuring station 12, the measuring station 12 generates a radio output signal that can be received by both compactors 14, 14' because they are positioned in the transmitting range of the measuring station 12 and are not shielded by other objects.

However, both compactors 14, 14' cannot receive the radio output signals of the measuring stations 12' and 12" directly. The compactor 14 is too far away from the two measuring stations 12' and 12" to be able to receive their radio output signals. The compactor 14' is currently under the bridge 40 and shielded by the bridge 40 from both measuring stations 12' and 12". To ensure nevertheless that the two compactors 14, 14' can take into account the existing vibration states at the bridge 40 and/or the commercial building 42 in their operation, another aspect of the invention provides that the various measuring stations 12, 12' and 12" set up a meshed network, a so-called ad hoc network. In such an ad hoc network, it is possible to use the various measuring stations 12, 12', 12" not only to generate radio output signals based on the respective sensor signals generated in said measuring stations, but also to use them and/or at least some of them as routers and/or network nodes. The routing methods used for such ad hoc networks make it possible to generate communication paths between the individual measuring stations 12, 12', 12" and the reception stations 16, 16' at the two compactors 14, 14' in adaptation to changing operating situations. In this way, not only the entire range of the network can be increased, but it can also be ensured that the various vibration-emitting machines, in this case the two compactors 14, 14', can essentially also be reached independently of their current positioning in the area to be monitored with respect to its vibration state. This also makes it possible to position measuring stations at locations that could otherwise be difficult or impossible to reach by radio, for example because of the topology or the size of the area to be monitored.

With such a system, the reception stations 16, 16' provided at the compactors 14 and/or 14' which, as already mentioned, can also be developed for parameterization of the measuring stations with a radio-transmitting unit, can be included in the network as well. They can therefore serve as transmission nodes that change their position because of movement with the compactors 14, 14' and it can be assumed that they are not at a position that is shielded from a radio connection. Furthermore, it is possible to integrate into such a network radio reception/transmitting units that are set up stationary and are not supposed to meet the functionality of receiving and generating information that relates to the vibration state. They merely serve as routing units that, for example, can also be provided at positions that are unsuitable for determining the vibration state, but are especially advantageous with respect to radio communication of the various measuring stations with the reception stations.

To increase the safety against external influences, it goes without saying that the network set up with the various measuring stations 12, 12', 12" and the reception stations 16, 16' can be encoded so that an external penetration of said network is not possible and in particular that other networks are ignored. This makes it possible to operate several different networks of this type in one and the same area, for example to be able to monitor and/or operate different types of vibration-emitting machines independently of one another.

In the definition of the routing method and/or the routing functionality of various measuring stations, the existing energy supply at these individual measuring stations can also be taken into account, for example, because it goes without saying that the routing functionality in the measuring stations also leads to an increased energy consumption. For example, a measuring station where principally only a small energy supply is available and/or the charging condition of an accumulator has already dropped considerably can be taken out of the routing functionality so that other transmission paths can be used to reduce the energy demand in such a measuring station as much as possible, which may be critical with respect to the energy situation and/or to keep it low from the beginning. Principally, the use of such a network already leads to a lower energy consumption because the transmission performance of each individual measuring station can be lowered insofar as it must only be guaranteed that a radio reception has to be guaranteed in each area of the region to be monitored where a reception station can be located, but only via the respective nearest measuring station and not also, if applicable, the measuring station that is farthest away.

Figure 3:
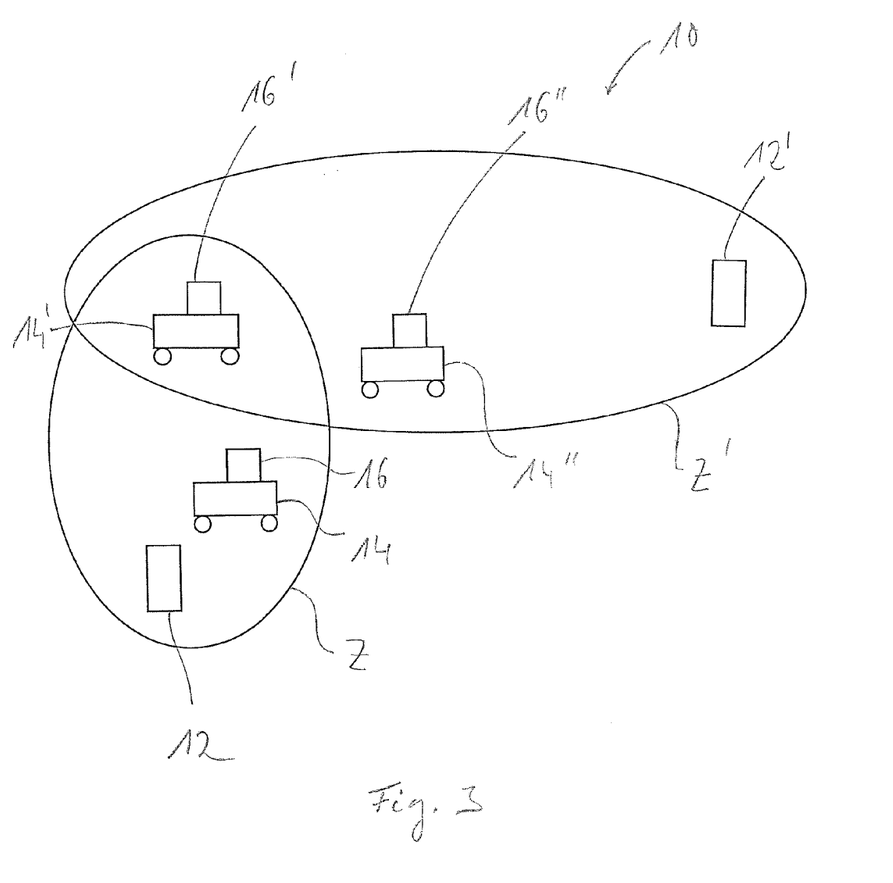
FIG. 3 in principal representation, the operation of a plurality of vibration-emitting construction machines in the area of overlapping measuring zones.

Another aspect of the present invention is shown below with reference to FIG. 3, which shows a system 10 with two measuring stations 12, 12'. In the area to be monitored by said measuring stations with respect to the vibration state, there are three vibration-emitting machines, such as, for example, compactors 14, 14', 14", each with a reception station 16, 16', 16".

In the way explained above, all compactors 14, 14' and 14" and/or the measuring stations 16, 16', 16" provided thereon, can communicate with the network set up with the two measuring stations 12, 12' so that the information provided by the measuring stations 12, 12' can be used in all vibration-emitting machines.

According to the invention, measuring zones Z, Z' are defined in association with the two measuring stations 12, 12'. When defining such a measuring zone Z, Z', for example, the vibration spread and/or vibration damping behavior can be taken into account after prior analysis of the substrate so that with respect to space, the possibly anisotropic measuring zones Z and/or Z' result when taking into account the setup of the substrate and/or also taking into account the possible structures located in the area of a respective measuring station 12 and/or 12'. The machines responsible for the oscillation emission and/or their emission behavior can principally also be taken into account in the definition of such a measuring zone Z, Z'.

The information deposited in a respective measuring station 12 and/or 12' can identify said actual respective measuring station and the associated measuring zone. The measuring zone can be identified, for example, by associating a specific abbreviation but alternately also by defining its spatial data.

The radio output signals put out by such measuring stations 12, 12' then include, in addition to the information identifying the respective vibration state, also information about the sending measuring station 12 or 12' and/or, if applicable, more specific information about the definition of a measuring zone. However, said information, which identifies the spread of a measuring zone, could also principally be deposited in a respective reception unit 16, 16', 16" so that said reception unit receives information about the sending measuring station 12 or 12' with the radio output signal and then associates information about the respective measuring zone Z and/or Z' with the respective sending measuring station. In a respective reception station 16, 16' and/or 16" a decision can be made whether or not the vibration state identified in a respective measuring station 12 and/or 12' is relevant for the current positioning of the compactor 14, 14' or 14". For example, the compactor 14 is in the measuring zone Z defined around the measuring station 12, but not in the measuring zone Z' of the measuring station 12'. This means that in the reception station 16, which receives the radio output signals of both measuring stations 12, 12', only the radio output signal that is sent by the measuring station 12 and/or 12' in whose area of relevance, i.e., measuring zone, the compactor 14 is located, which in this case is measuring zone Z and therefore measuring station 12, is used for further processing or display or the like. When displaying the vibration state, the radio output signal of the measuring station 12' can be ignored. Likewise, the radio output signal of the measuring station 12 can be ignored with the compactor 12' because it is not located in the measuring zone Z. The compactor 14' is located in the overlapping area of the two measuring zones Z and Z' so that both radio output signals of the measuring stations 12, 12' can be used in the reception unit 16' because the vibrations generated by the compactor 14' could be relevant for both measuring zones. Then, for example, the information in the two radio output signals can be displayed.

To facilitate this approach, it is therefore not only necessary to define the spatially expanded measuring zones Z, Z' in association with the measuring stations 12, 12' and have the appropriate information available in the measuring stations 12, 12' and/or the reception stations 16, 16', 16". Rather, it is also necessary to obtain information about the current positioning of the compactors 14, 14' and/or 14", i.e., the vibration-emitting machines, relative to said measuring zones Z, Z'. This can be done, for example, by taking into account the generally available GPS information in the various vibration-emitting machines. Principally, it can be provided here that the association of one or a plurality of measuring stations 12 and/or 12' with measuring zones Z and/or Z' is kept available as information in the respective measuring stations 12 and/or 12' and, for example, transmitted via radio in connection with the information that represents the vibration state. For example, in the reception stations 16, 16' and/or 16" is where information obtained via GPS about the current positioning of a respective compactor and/or the reception station 16, 16' and/or 16" provided therein is available. In the actual reception unit, the information transmitted via radio can then be compared to compare in which area of relevance, i.e., in which measuring zone Z and/or Z', a respective compactor is located, so that it can also be determined what information representing a vibration state has to be taken into account. The information that pertains to the spatial expansion of the various measuring zones Z, Z' and is kept available, for example, in the respective measuring stations 12 and/or 12' associated with them to transmit information related to the vibration state, can also be in a GPS format, which can especially simplify the comparison with the information related to the positioning of a respective compactor 14, 14', 14" in a reception station 16, 16', 16".

It goes without saying that in association with individual measuring stations and/or objects to be monitored, a plurality of measuring zones can be defined, each of which can be defined for various vibration-generating events. For example, in association with one and the same object to be monitored, for example buildings, a measuring zone to be taken into account in the monitoring of the vibration by a compactor can be defined, and a measuring zone to be taken into account in the monitoring of vibrations generated by piling equipment can be defined. In the definition of such measuring zones, the hazard effect of the various vibration-generating machines, which in terms of the present invention also includes detonations, can be taken into account.

Finally, it should be pointed out that the system explained above could be varied in its embodiment with respect to various aspects. For example, it is possible to design the reception units in such a way that they generally generate a display or replay only if there is a critical state and therefore a change in the operating mode of a vibration-emitting machine is required. In case of a non-critical state, a display is not necessary. Principally, it is also possible to send, parallel to the radio output signals that are clearly reduced with respect to their information content, also signals in which the sensor signals of the various sensors are transmitted; this is possible, for example, if the direct reception of higher-frequency signals is possible because of the spatial positioning of a reception station or the use of a routing functionality. Furthermore, it goes without saying that it is also possible to design the reception station in such a manner that it can be used via the radio connection with the measuring stations to configure them by inputting appropriate information, i.e., to be able to input [into the measuring stations] the various information stated above, which is relevant and/or required for the evaluation. The reception station can be principally also be used for archiving the information transmitted by the various measuring stations and, if applicable, it can also be used by information that identifies, in timely association to the information transmitted by the measuring stations, the operating condition of a respective vibration-emitting machine, for example its vibration operation. In connection with said information and/or data, which essentially reflect the operation of a vibration-emitting machine and the effect of said operation recorded at the measuring stations, data can be stored which on the one hand describe the positioning of the vibration-emitting machine and which furthermore can describe one or, if applicable, a plurality of the measuring zones described above. Said information, which relates to spatial coordinates and/or areas, can be obtained with GPS, for example, and/or provided as GPS data and stored. Because of the totality of stored information, it is possible to reconstruct at a later date the operation of a vibration-emitting machine and its effects, for example on structures or the like, and/or display them again. In association therewith it can also be advantageous, for example, to store and/or keep available the spatial expansion of a construction site as background information to be able to display the various data provided and stored earlier in connection with the information related to the spatial expansion of a construction site. Such a display can also already occur, for example, during the operation of a vibration-emitting machine on a monitor or the like to enable an operator to backtrack to see how and/or where a vibration-emitting machine operated in the past in the area of a construction site. To archive such data, it is furthermore possible to provide the reception units with a machine-readable interface, for example, to be able to transmit the data to be archived to an overriding archiving unit. This limits the storage volume required for such data in the actual reception units.

The invention claimed is:

1. System for providing information representing a vibration state for the operation of vibration-emitting construction machines, said system comprising:
    at least one measuring station with at least one sensor for recording at least one variable related to the vibration state, and with a radio-transmitting unit for outputting a radio output signal related to the variable;
    at least one reception station for receiving the radio output signal of the at least one measuring station;
    wherein the at least one measuring station comprises an evaluation unit for receiving a sensor signal from the at least one sensor for generating an evaluation signal representing the vibration state based on the sensor signal;
    wherein the radio-transmitting unit generates the radio output signal on the basis of the evaluation signal; and
    wherein a plurality of measuring stations and/or reception stations is provided, at least one measuring station and/or at least one reception station having a radio-receiving unit for receiving the radio output signal of at least one other measuring station, the radio-transmitting unit of the at least one measuring station having a radio-receiving unit and/or a radio-transmitting unit of the at least one reception station having a radio-receiving unit being arranged for generating a radio output signal based on a radio output signal received from another measuring station and/or from another reception station.

2. System according to claim 1, wherein the at least one reception station comprises:
    a radio-receiving unit for receiving the radio output signal from at least one measuring station,
    a signal processing unit for generating vibration display information for an optical and/or acoustical vibration state reproduction unit and/or for generating vibration state reaction trigger information to trigger a vibration-emitting machine.

3. System according to claim 1 wherein at least one sensor is an acceleration sensor and/or a speed sensor.

4. System according to claim 1, wherein the evaluation unit is designed to generate the evaluation signal based on one or more of the following information:
    a location information that represents a measuring location,
    a measuring zone (Z, Z') around the measuring location,
    a vibration threshold value information,
    a vibration type information that represents the type of vibration,
    a vibration type information that represents the type of vibration in connection with a vibration type threshold value information,
    a measuring time information, and
    a measuring time information in connection with a measuring time threshold value information.

5. System according to claim 4, wherein the evaluation unit has at least one associated interface for inputting at least one information and/or configuration information used as a basis in connection with the sensor signal to generate the evaluation signal.

6. System according claim 1, wherein the evaluation unit has an associated memory unit for storing the sensor signal of at least one sensor and/or the evaluation signal, preferably for the later generation of the radio output signal.

7. System according to claim 1, wherein the radio output signal output by the at least one measuring station includes identification information that identifies the measuring station.

8. System according to claim 7, wherein the identification information includes information about the measuring location and/or a measuring zone around the measuring location of the measuring station.

9. System according to claim 1, wherein the radio output signal generated by the radio-transmitting unit of the at least one measuring station or the at least one reception station corresponds to the radio output signal received from another measuring station or reception station.

10. System according to claim 1, wherein a plurality of measuring stations and/or reception stations form a meshed network for transmitting information to at least one reception station.

11. Method for operating a vibration-emitting construction machine on the basis of information representing a vibration state the method comprising steps of:
    defining a measuring zone in association with each one of a plurality of measuring stations;
    generating information representing a vibration state in association with each one of the measuring zones by means of the measuring stations; and
    operating the machine on the basis of the information representing the vibration state in one of the measuring zones only if said machine is located in the measuring zone or is moving into the measuring zone.

12. Method according to claim 11, wherein the measuring zone is defined based on one or more of:
   properties of the substrate in the area of the measuring zone;
   type of measuring location, and
   type of the vibrations.

\* \* \* \* \*